United States Patent [19]  
Lee

[11] 4,032,306  
[45] June 28, 1977

[54] ISOTOPE SEPARATION BY PHOTODISSOCIATION OF VAN DER WAAL'S MOLECULES

[75] Inventor: Yuan T. Lee, Berkeley, Calif.

[73] Assignee: The United States of America as represented by the United States Energy Research and Development Administration, Washington, D.C.

[22] Filed: Mar. 8, 1976

[21] Appl. No.: 664,858

[52] U.S. Cl. .................................... 55/17; 55/1; 204/157.1 R; 204/DIG. 11
[51] Int. Cl.² .......................................... B01J 1/10
[58] Field of Search .......... 204/157.1 R, DIG. 11; 55/17, 277

[56] References Cited
UNITED STATES PATENTS

| 3,558,877 | 1/1971 | Pressman | 204/DIG. 11 |
| 3,944,399 | 3/1976 | Gspann | 55/17 |

Primary Examiner—Howard S. Williams  
Attorney, Agent, or Firm—Dean F. Carlson; Roger S. Gaither; Irene S. Croft

[57] ABSTRACT

A method of separating isotopes based on the dissociation of a Van der Waal's complex. A beam of molecules of a Van der Waal's complex containing, as one partner of the complex, a molecular species in which an element is present in a plurality of isotopes is subjected to radiation from a source tuned to a frequency which will selectively excite vibrational motion by a vibrational transition or through electronic transition of those complexed molecules of the molecular species which contain a desired isotope. Since the Van der Waal's binding energy is much smaller than the excitational energy of vibrational motion, the thus excited Van der Waal's complex dissociate into molecular components enriched in the desired isotope. The recoil velocity associated with vibrational to translational and rotational relaxation will send the separated molecules away from the beam whereupon the product enriched in the desired isotope can be separated from the constituents of the beam.

12 Claims, 1 Drawing Figure

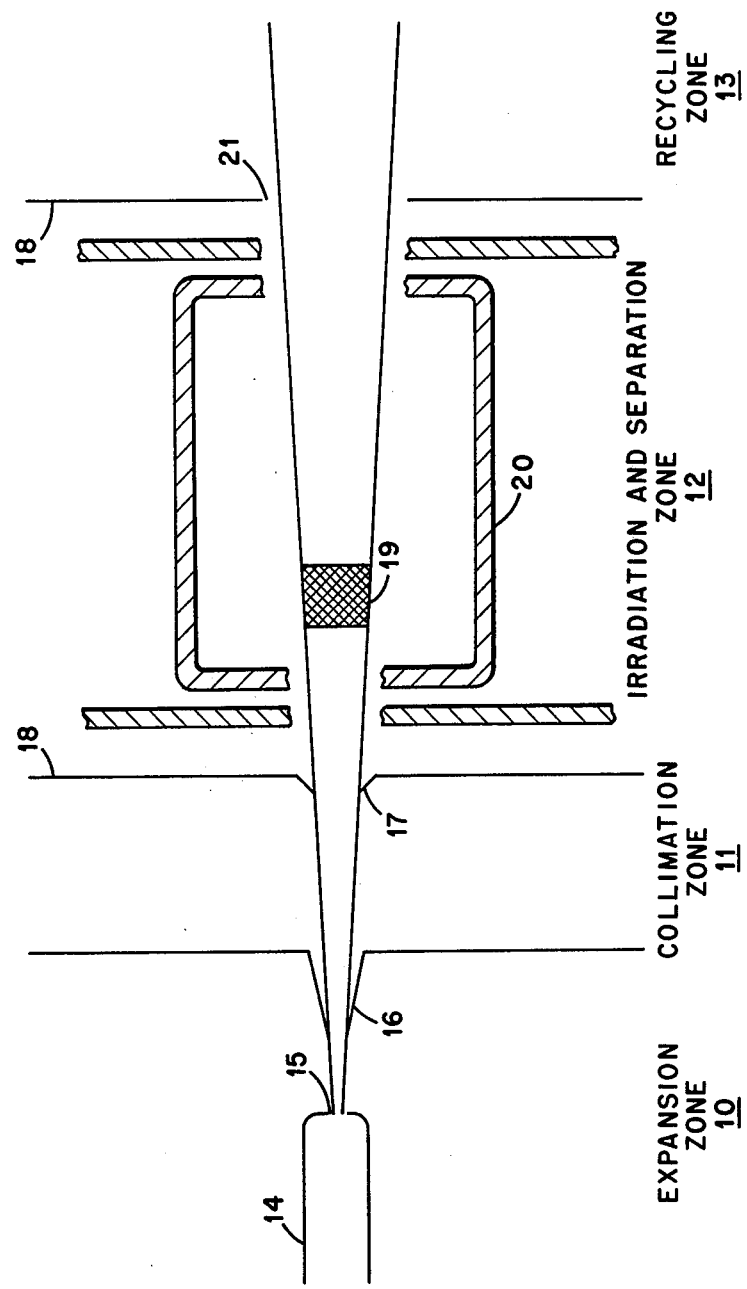

ISOTOPE SEPARATION BY PHOTODISSOCIATION OF VAN DER WAAL'S MOLECULES

BACKGROUND OF THE INVENTION

The invention described herein was made in the course of, or under, United States Energy Research and Development Administration Contract No. W-7405-ENG-48 with University of California.

This invention relates to isotope separation processes. More particularly this invention relates to a method of isotope separation by photodissociation of Van der Waal's molecules.

Several processes for isotope separation make use of the isotope shift, that is, a slight shift of the lines in the absorption spectra of elements or molecular species due to the small difference in nuclear mass of the isotopes of the same element contained therein. Changes in nuclear mass can shift electronic, vibrational, and rotational energy levels. When the shift places the absorption line of one isotopic species at a frequency at which the others are transparent, it is possible to excite selectively that species with a source of radiation of sufficiently narrow width.

A common feature of all separation methods based on the isotope shift is the selective excitation of one of the isotopic species by radiation, particularly laser radiation, tuned to a specific absorption line, followed by a physical or chemical process which acts on excited species and separates them from unexcited ones. The method for realizing separation following selective excitation of an atom or molecule may or may not require the absorption of a second photon.

The isotope separation schemes which do not require photon absorption to effect separation of excited species from unexcited ones are sometimes referred to as "one-photon or one quantum step processes", the one photon being used, theoretically, for the selective excitation step. For example, the excited species could spontaneously undergo an irreversible change as in predissociation, preionization, or isomerization. Or a chemical reagent could be used which both reacts with the excited state so rapidly that energy transfer cannot occur and reacts with the ground state so slowly that the reagents can be mixed without reaction. Various isotope separation schemes based on the foregoing concepts are described in C. Bradley Moore, *Accounts of Chemical Research* 6 323 (1975).

The one-photon processes have the potential for lower laser energy requirements. However, the known onephoton processes generally require photon energies which can not be efficiently supplied by available laser systems. The need exists for a one-photon process which can efficiently utilize readily available photons, particularly infrared (IR) photons.

SUMMARY OF THE INVENTION

The isotope separation process of the present invention is based on the dissociation of Van der Waal's molecules which have been isotopically selectively excited by a vibrational transition. Broadly, the present process comprises the steps of forming a vapor stream, or beam, of molecules of a Van der Waal's complex containing, as one partner of the complex, a molecular species in which an element is present in a plurality of isotopes, and subjecting the beam of Van der Waal's molecules to radiation of a predetermined frequency which will vibrationally excite complexed molecules of the molecular species which contain a first such isotope without substantially exciting those complexed molecules of the molecular species which contain a second such isotope. Since the Van der Waal's binding energy is much smaller than the excitational energy of vibrational motion, the selectively excited Van der Waal's molecules dissociate to yield the molecular species enriched in the first isotope and the other partner of the complex. The Van der Waal's molecules containing unexcited molecular species remain substantially undissociated. The recoil velocity associated with vibrational to translational and rotational relaxation will send the dissociation products away from the beam. The dissociation product enriched in the first isotope can readily be separated from the remaining components, for example, by cryogenic trapping, that is to condense separated molecules on a cold surface.

The term "Van der Waal's complex" is used herein to denote the complex formed by two or more molecules, which may be of the same or different molecular species, bound together by Van der Waal's forces. According to *The International Dictionary of Physics and Electronics*, D. Van Nostrand & Co., N.Y., 1956, Van der Waal's forces are defined as interatomic or intermolecular forces of attraction due to the interaction between fluctuating dipole moments associated with molecules not possessing permanent dipole moments. These dipoles result from momentary dissymmetry in the positive and negative charges of the atom or molecule, and on neighboring atoms or molecules. These dipoles tend to align in antiparallel direction and thus result in a net attractive force. This force varies inversely as the seventh power of the distance between atoms or molecules.

The present process falls in the category of one-photon or one-quantum step processes. Furthermore, the present process effectively utilizes photons which can be efficiently supplied by available laser sources, in particular, infrared (IR) photons.

It is, therefore, among the objects of this invention to provide a method for separating isotopes.

More particularly, it is an object of this invention to provide a method for separating isotopes based on photoinduced dissociation of Van der Waal's molecules.

It is a further object of this invention to provide a method for separating isotopes which can effectively utilize infrared photons.

Other objects and advantages will become apparent from the following detailed description.

BRIEF DESCRIPTION OF THE DRAWING

The accompanying figure is a schematic representation of an exemplary system embodiment for practice of the present invention.

DETAILED DESCRIPTION OF THE INVENTION

Broadly, the method of the present invention can be illustrated by the following diagram:

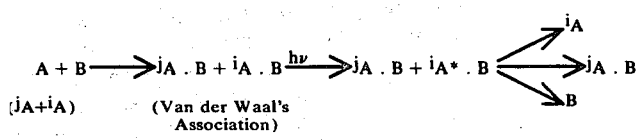

wherein A is molecular species consisting of $^iA$ which represents those molecules containing a first isotope of an element contained therein and $^jA$ represents those molecules containing a second isotope of the same element, B is the partner species (atomic or molecular) for formation of Van der Waal's molecules, and $^jA.B$ and $^iA.B$ represent Van der Waal's molecules of the different isotopic species of A. Other Van der Waal's molecules may also be formed in the process, e.g., A.A. and B.B, but such molecules will remain substantially in the beam and will not interfere with the separation process.

The Van der Waal's molecules containng the vibrationally excited isotopic species are represented by $^iA^*.B$. Since the Van der Waal's binding energy is much smaller than the excitational energy of vibrational motion, these selectively excited molecules dissociate into $^iA$ and B. Separation of the dissociation product $^iA$ from other isotopic species $^jA$ depends on the recoil velocity of the molecules of $^iA$ in the process of dissociation of $^iA^*.B$ through a vibrational to translational and rotational energy transfer relaxation.

The Van der Waal's molecules containing the unexcited isotopic species, i.e., $^jA.B$ remain substantially undissociated and in the molecular beam. Uncomplexed molecules of A and B will also remain substantially in the beam.

Referring more particularly to the accompanying drawing, the figure represents a four-stage differentially pumped chamber consisting of expansion zone 10, collimation or buffer zone 11, irradiation and separation zone 12, and recycling zone 13. Typically, the pressure conditions therein are as follows: expansion zone 10, about $10^{-3}$ torr; collimation zone 11, about $10^{-5}$ torr; and the separation zone 12, about $10^{-7}$ torr (1 torr $\cong$ 1.3 × $10^{-2}$ pascal).

A gaseous mixture containing molecular species A and B is expanded from high pressure region 14 into expansion zone 10 through a small nozzle 15, producing a gas stream of molecules referred to herein as a beam of molecules or molecular beam. The terminal temperature of the molecular beam formed by isentropic expansion will become very low and a substantial portion of species A will associate with B to form Van der Waal's molecules A.B consisting of those molecules $^iA.B$ containing a first isotope of an element in A and those molecules $^jA.B$ containing a second isotope of the same element. Most of the gas mixture expanded through nozzle 15 into chamber 10 will be confined to a relatively small angle in a typical expansion from 1 atm to $10^{-3}$ torr. The resulting molecular beam is collimated by means of skimmer 16 and defining slit 17 in buffer zone 11 so that the central part of the beam enters into the separation zone 12. Liquid nitrogen cooled stoppers 18 prevent condensation of the molecules from chamber 11 on the outside wall of liquid nitrogen cooled trap 20.

In zone 12, the molecular beam is exposed to a beam of radiation from a source not shown, preferably a laser source, of a given frequency such as to vibrationally excite those molecules $^iA$ within the complex $^iA.B$ without substantially exciting those molecules $^jA$ within the complex $^jA.B$. The radiation beam is directed transversely of the molecular beam and intersects the molecular beam in irradiation region 19. The vibrationally excited Van der Waal's molecules dissociate with appreciable recoil velocities.

The velocity vectors associated with the recoils of $^iA$ in the process of dissociation of the excited molecules $^iA.B$ are isotropically distributed. Consequently, most of the product $^iA$ dissociated from Van der Waal's molecules by selective vibrational excitation deviates from the beam and is cryogenically trapped in liquid nitrogen cooled trap 20 in separation zone 12.

The molecular beam containing remaining components passes through separation zone 12 into recycling zone 13 by means of exit orifice 21. The exiting molecular beam consists principally of uncomplexed species A and B, undissociated Van der Waal's molecules of $^jA.B$, and other Van der Waal's molecules which may have formed during expansion, such as A.A and B.B.

By the present process, a desired isotopic species can be separated in almost pure form in a single passage.

The molecular species A containing the isotope to be separated should be a simple molecule, preferably a diatomic or triatomic molecule, such that after isentropic expansion, all the Van der Waal's molecules formed will be in a few lowest quantum states. Only a small number of IR lasers are needed to dissociate all Van der Waal's molecules. Most diatomic molecules containing one light atom, preferably atomic number less than about 40, are best suited because the excitation energy of vibrational motion is much larger than the Van der Waal's interaction for these molecules. A significant amount of energy will appear as translational energy in the separated molecules. The larger the recoil valocity in comparison with the initial velocity of the Van der Waal's molecule, the easier the separation. Radical molecules can also be handled in the present process.

The partner species B should be different from A so as not to interfere with separation of the desired isotopic species. It is preferred to use rare gas atoms, particularly argon, krypton, and xenon, as the partner species because the Van der Waal's potential is usually smaller if a rare gas atom is involved. Besides, for atomic species, there is no internal degree of freedom, except electronic excitation, so a larger fraction of the vibrational energy will appear as translational motion after dissociation. A considerable excess of B in the gaseous mixture is preferred. The concentration of B to A in the gaseous mixture is preferably at least 10 to 1.

The process of this invention is applicable to the separation of any isotopes including those of uranium. For the separation of uranium isotopes the most suitable Van der Waal's molecules are UO.Xe and UF.Xe. UO and UF have vibrational quanta of more than 1 kcal/mole, and the Van der Waal's interaction potential of UO.Xe and UF.Xe are expected to be less than 0.5 kcal/mole. Xenon is the most suitable candidate for giving sufficient recoil to the heavy UO and UF. Xenon could be easily trapped in the cryogenic pumping system and recycled. Although radical molecules such as UF and UO are not easily handled in conventional batch systems, in a flow system using xenon as carrier gas, UF and UO can be produced rather easily through thermal decomposition of suitable volatile sandwich compounds such as $UF(C_5H_5)_3$. When forming UF.Xe in this manner, the nozzle temperature should not exceed 1000 K; otherwise, the beam velocity will become too high and the separation of uranium isotopes would have to depend on simultaneous two vibrational quanta relaxation in order to acquire sufficient recoil velocity. Once UF or UO is formed through the thermal decomposition of such a sandwich compound, it is possible to form UO.Xe or UF.Xe after isentropic expansion.

Although frequency tunable lasers are preferred as the radiation source, other sources may be used provided they are of the proper wavelength region and efficiency. It is to be emphasized that the present isotope separation method effectively uses relatively inexpensive photons, that is, infrared photons which can be produced by efficient lasers such as $CO_2$ lasers.

However, visible photons can also be used in the present method by simultaneously exciting electronic and vibrational excitation. Only the vibrational excitation will be effective for separation, but in some instances, e.g., in the excitation of a homonuclear diatomic molecule wherein IR excitation is relatively inefficient, the tunable visible laser can be more effective.

The frequency of the radiation used in the selective excitation step is predetermined on the basis of the optical spectra of the various isotopic species of A in Van der Waal's association with partner species B. Such data, if not available in standard references, is readily obtainable by experiment.

The following example is illustrative of the process of the present invention.

EXAMPLE

Considering the separation of $^{79}Br$ from other isotopes of Br, mainly $^{81}Br$, krypton and an HBr source are mixed in the mole ratio of about 10:1. Since hydrogen in its natural occurrence contains over 99.9% protium ($^1H$), the HBr source can be considered to consist of species contaiing the different isotopes of bromine, mainly $H^{79}Br$ and $H^{81}Br$. The gas mixture is expanded from a high pressure (about 1 atm) into a vacuum chamber maintained at about $10^{-3}$ torr through a small nozzle. About 20% of the HBr (or 2% of Kr) can be converted into the Van der Waal's molecule HBr.Kr. Minor amounts of other Van der Waal's molecules will be formed, such as $Kr_2$, $Kr_3$, and $(HBr)_2$, but these molecules will not interfere in the separation process.

most of the gas mixture expanded through the nozzle in the expansion chamber is confined to a relatively small angle in a typical expansion from 1 atm to $\sim 10^{-3}$ torr. By means of a skimmer and defining slit, the central part of the beam enters the separation and irradiation chamber. An intense IR laser is tuned to a frequency (about 2600 cm$^{-1}$) to excite the vibrational motion of $H^{79}Br$ in $H^{79}Br.Kr$ without substantialy exciting the vibrational motion of $H^{81}Br$ in $H^{81}Br.Kr$ Since the Van der Waal's binding energy is much smaller than the excitation energy of $H^{79}Br$ and the transit time of the molecule through the separation chamber ($\sim 10^{-4}$ sec) is much longer than the vibrational period ($10^{-12}$ sec), substantially all excited Van der Waal's molecules containing $HBr^{79}$ decompose with appreciable recoil velocities before passing through the separation chamber. Most of the $H^{79}Br$ dissociated from Van der Waal's molecules by laser excitation deviates from the beam and collects on the liquid nitrogen cooled (77 K) walls of the separation chamber.

The remaining components of the gas mixture, mainly unconverted HBr, Kr, $H^{81}Br.Kr$, and such Van der Waal's molecules as $Kr_2$, $Kr_3$, and $(HBr)_2$, pass through the separation chamber for recycling.

With adequate pumping speed, more than one mole of gas mixture can pass through the separation chamber per hour in a relatively small scale laboratory operation. Considering that about 1% of the gas mixture will be $H^{79}Br.Kr$ and that a CW IR laser, operating at approximately 3–4 watts, can excite and dissociate all $H^{79}Br.Kr$ molecules in the beam, $\sim 1$ g/hr of $^{79}Br$ can be separated. This rate of separation can be increased to $\sim 10$ g/hr of $^{79}Br$ with a liquid helium or a liquid hydrogen cryopumping arrangement and with multiple nozzles.

It is to be emphasized that the method of the present invention does not involve breakage of a chemical bond. The separation of desired isotopes depends on the recoil velocity of the molecule containing the desired isotope in the process of dissociation of a Van der Waal's complex. The formation of Van der Waal's molecules by supersonic expansion, collimation of the beam, selective excitation of Van der Waal's molecules containing desired isotopes and subsequent separation of desired isotopic species can be accomplished in one clean operation.

While a specific example and operational sequence for carrying out the invention have been described, modifications and changes will become apparent to those skilled in the art, and it is intended to cover in the appended claims all such modifications and changes as come within the spirit and scope of the invention.

What I claim is:

1. A method for separating isotopes by photo-induced dissociation of molecules of a Van der Waal's complex represented by A-B wherein A is a molecular species in which an element is present in a plurality of isotopes, $^iA$ representing those molecules of A containing a first such isotope and $^jA$ representing those molecules of A containing a second such isotope and B is a species different from A and capable of being bound to A by Van der Waal's forces, the molecules of $^iA$ in $^iA.B$ being capable of absorbing radiation in a given spectral region and being vibrationally excited thereby to a significantly greater degree than the molecules of $^jA$ in $^jA.B$, which comprises:

forming a beam of molecules of said Van der Waal's complex A.B;

subjecting the beam of Van der Waal's molecules to radiation in the given spectral region, thereby vibrationally exciting the molecules of $^iA$ in $^iA.B$ and inducing dissociation of the thus excited molecules of $^iA.B$ into products $^iA$ and B without substantially exciting the molecules of $^jA$ in $^jA.B$ and without substantially dissociating molecules of $^jA.B$, the excited molecules of $^iA.B$ dissociating with sufficient recoil velocity to substantially deflect the products $^iA$ and B from the molecular beam; and recovering the deflected dissociation product substantially enriched in $^iA$.

2. The method according to claim 1 wherein the beam of Van der Waal's molecules is formed by supersonic expansion of a gaseous mixture of A and B.

3. The method according to claim 1 wherein the beam of Van der Waal's molecules is collimated prior to the irradiation step.

4. The method according to claim 3 wherein the radiation is a beam of radiation directed transversely of the collimated beam of molecules.

5. The method according to claim 1 wherein the radiation is laser radiation.

6. The method according to claim 1 wherein the given spectral region is in the infrared range.

7. The method according to claim 1 wherein B is a rare gas.

8. The method according to claim 7 wherein B is selected from krypton and xenon.

9. The method according to claim 1 wherein the deflection dissociation product enriched in $^iA$ is recovered by cryogenic trapping.

10. The method according to claim 1 wherein A is selected from a diatomic molecular species and a triatomic molecular species.

11. A method according to claim 1 wherein A contains bromine in a plurality of isotopes.

12. A method according to claim 1 wherein A contains uranium in a plurality of isotopes.

* * * * *